(12) United States Patent
Klingels et al.

(10) Patent No.: US 7,765,786 B2
(45) Date of Patent: Aug. 3, 2010

(54) AIRCRAFT ENGINE WITH SEPARATE AUXILIARY ROTOR AND FAN ROTOR

(75) Inventors: Hermann Klingels, Eching (DE); Rudolf Selmeier, Fahrenzhausen (DE)

(73) Assignee: MTU Aero Engines GmbH, Munich (DE)

( * ) Notice: Subject to any disclaimer, the term of this patent is extended or adjusted under 35 U.S.C. 154(b) by 1210 days.

(21) Appl. No.: 11/219,469

(22) Filed: Sep. 2, 2005

(65) Prior Publication Data

US 2006/0059887 A1    Mar. 23, 2006

(30) Foreign Application Priority Data

Sep. 3, 2004    (DE) ........................ 10 2004 042 739

(51) Int. Cl.
*F02K 3/02*    (2006.01)
(52) U.S. Cl. ............... 60/226.1; 60/39.162; 60/268; 416/128; 416/201 R
(58) Field of Classification Search .............. 60/268, 60/39.162, 226.1; 415/61, 68, 69; 416/124, 416/125, 128, 129
See application file for complete search history.

(56) References Cited

U.S. PATENT DOCUMENTS

| | | | | |
|---|---|---|---|---|
| 3,729,957 A | * | 5/1973 | Petrie et al. ................. | 60/226.1 |
| 4,251,987 A | * | 2/1981 | Adamson ...................... | 60/805 |
| 4,751,816 A | * | 6/1988 | Perry .......................... | 60/226.1 |
| 4,790,133 A | * | 12/1988 | Stuart ......................... | 60/226.1 |
| 4,909,031 A | * | 3/1990 | Grieb .......................... | 60/225 |
| 4,964,315 A | * | 10/1990 | Willis, Jr. .............. | 74/665 GA |
| 5,010,729 A | * | 4/1991 | Adamson et al. ........... | 60/226.1 |
| 6,082,967 A | * | 7/2000 | Loisy ......................... | 416/129 |
| 6,381,948 B1 | * | 5/2002 | Klingels .................... | 60/226.1 |
| 6,722,847 B2 | | 4/2004 | Freeman et al. | |
| 7,299,621 B2 | * | 11/2007 | Bart et al. .................. | 60/226.1 |
| 7,334,392 B2 | * | 2/2008 | Moniz et al. .................. | 60/204 |

FOREIGN PATENT DOCUMENTS

RU    2030644 C1 *    3/1995

\* cited by examiner

*Primary Examiner*—Michael Cuff
*Assistant Examiner*—Phutthiwat Wongwian
(74) *Attorney, Agent, or Firm*—Crowell & Moring, LLP

(57) ABSTRACT

A fan for an aircraft engine, particularly a gas turbine aircraft engine, is disclosed. The fan has a fan rotor with fan blades, which extend radially outwardly from a hub to an outer flow path wall of a fan flow path. The fan has an auxiliary rotor that is positioned upstream of the fan rotor and has auxiliary blades that extend radially outwardly from a hub and end at a distance from the outer flow path wall of the fan flow path. The auxiliary rotor and the fan rotor are designed as separate rotors, such that the auxiliary rotor can be operated at a higher speed than the fan rotor.

16 Claims, 2 Drawing Sheets

AIRCRAFT ENGINE WITH SEPARATE AUXILIARY ROTOR AND FAN ROTOR

This application claims the priority of German Patent Document No. 10 2004 042 739.9, filed Sep. 3, 2004, the disclosure of which is expressly incorporated by reference herein.

BACKGROUND AND SUMMARY OF THE INVENTION

The invention relates to a fan for an aircraft engine, particularly a gas turbine aircraft engine. The invention further relates to an aircraft engine.

Aircraft engines consist of, among other things, a fan and a core engine. The core engine comprises at least a compressor, a combustion chamber and at least one turbine. Conventional aircraft engines have a fan with a fan rotor, which is equipped with fan blades. The fan blades form a blade ring and extend radially outwardly from a hub of the fan rotor to an outer flow path wall of a fan flow path. In conventional aircraft engines of this type, the fan rotor is thus equipped with a single row of blades, i.e., it has only one ring of fan blades. In fans of this type, the mass flow that can be achieved by the fan is limited.

To increase the mass flow generated by a fan, it is known to position an auxiliary rotor upstream of the fan rotor. U.S. Pat. No. 6,722,847 B2, for example, discloses a fan of an aircraft engine having a fan rotor and an auxiliary rotor positioned upstream of the fan rotor. The fan blades of the fan rotor extend radially outwardly to the outer flow path wall of the fan flow path. The auxiliary blades of the auxiliary rotor, however, extend radially outwardly from a hub and end at a substantial distance from the outer flow path wall of the fan flow path. In accordance with U.S. Pat. No. 6,722,847 B2, the auxiliary rotor is an integral component of the fan rotor. As a result, the auxiliary blades are rigidly connected to the fan blades, such that, according to this reference, both rotors must rotate at the same speed and in the same direction of rotation.

Based thereon, it is an object of the invention to provide a novel fan for an aircraft engine, particularly a gas turbine aircraft engine, and a novel aircraft engine.

According to the invention, the auxiliary rotor and the fan rotor are designed as separate rotors, such that the auxiliary rotor can be operated at a higher speed than the fan rotor.

According to the present invention, the auxiliary rotor and the fan rotor are designed as two separate rotors, such that the auxiliary rotor can be operated at a higher speed than the fan rotor. This significantly increases the compression ratio in the range of action of the auxiliary rotor and thereby enables an increase in the mass flow generated by the fan. The increased mass flow rate and the increased compression ratio in the hub region result in a lower compression ratio in the outer fan range for a given diameter of the fan flow path and a specific thrust of the aircraft engine. The lower compression ratio is produced with a lower circumferential speed, such that relative Mach numbers become smaller, and fewer losses and thus an improved efficiency can ultimately be achieved. Furthermore, the reduced circumferential speeds and the reduced compression ratios significantly reduce the noise of the aircraft engine. Another advantage is that foreign bodies and impurities can be better centrifuged out of the air drawn in, so that the risk of damage to and erosion in the core engine is minimized.

According to an advantageous further refinement of the invention, a transmission ratio between the auxiliary rotor speed and the fan rotor speed is variable. The auxiliary rotor and the fan rotor can be operated in the same direction of rotation or in opposite directions of rotation.

BRIEF DESCRIPTION OF THE DRAWINGS

Preferred further refinements of the invention are set forth in the description below. Exemplary embodiments of the invention, which shall not be construed as a limitation thereof, will now be described in greater detail with reference to the drawings, in which.

DETAILED DESCRIPTION OF THE DRAWINGS

The present invention will now be described in greater detail with reference to FIGS. 1 and 2.

Figure 1:
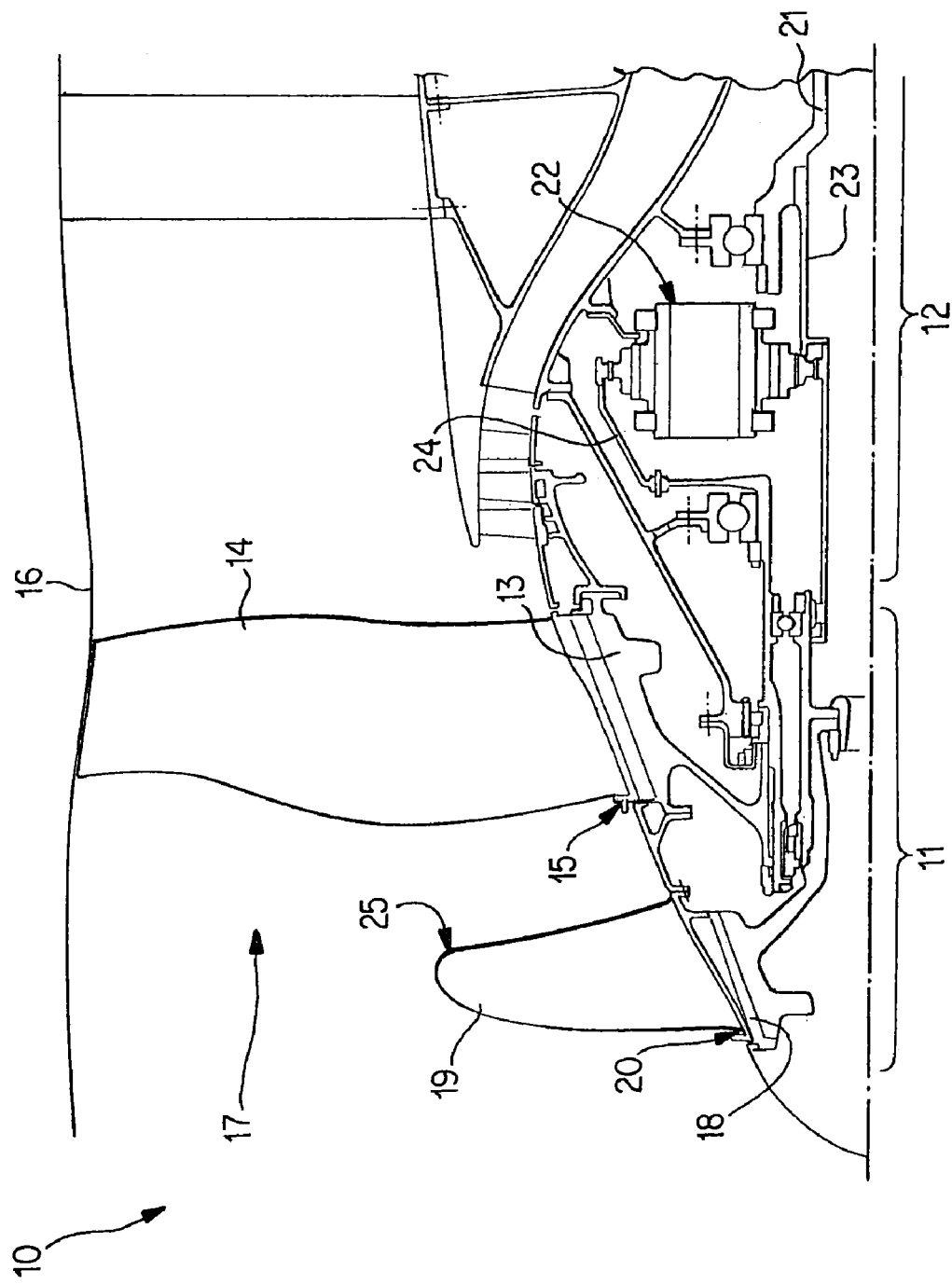
FIG. 1 is a cross-sectional detail of the aircraft engine according to the invention based on a first exemplary embodiment.

FIG. 1 shows a partial cross-section of an aircraft engine 10 according to the invention taken in the region of a fan 11 and an adjoining core engine 12 downstream of the fan 11.

The fan 11 comprises a fan rotor 13 with fan blades 14, such that the fan blades 14 of the fan rotor 13 form a ring of blades. As may be seen in FIG. 1, the fan blades 14 extend radially outwardly from a hub 15 to an outer flow path wall 16 of a flow path 17 of the fan 11. The fan blades 14 of the fan rotor 13 thus extend from the hub 15 of the fan rotor 13 across the entire radial extent of the fan flow path 17.

According to FIG. 1, an auxiliary rotor 18 is positioned upstream of the fan rotor 13. The auxiliary rotor 18 comprises auxiliary blades 19, which also extend radially outwardly from a hub 20 of the auxiliary rotor 18 but which end at a substantial distance from the flow path wall 16 of the fan flow path 17. Thus, the radial extent of the auxiliary blades 19 of the auxiliary rotor 18 is between 30% and 50% of the radial extent of the fan flow path 17.

According to the invention, the fan rotor 13 and the auxiliary rotor 18 are designed as two separate rotors. In terms of the invention, the auxiliary rotor 18 is operated at a higher or greater speed than the fan rotor 13. The auxiliary rotor 18 and the fan rotor 13 can be operated in the same direction of rotation or in opposite directions of rotation. Thus, aside from the different speeds, the fan rotor 13 and the auxiliary rotor 18 can also have different directions of rotation.

Since the auxiliary rotor 18 is operated at a substantially higher speed than the fan rotor 13, the mass flow rate can be significantly increased by the fan according to the invention for a given diameter of the fan flow path. The compression ratio in the effective range of the auxiliary rotor 18 and therefore in the hub region of the fan can thus be increased substantially.

The transmission ratio between the speed of the auxiliary rotor 18 and the speed of the fan rotor 13 can be either fixed or variable. In a variable transmission ratio between the auxiliary rotor speed and the fan rotor speed, the mass flow rate and the compression ratios in the fan can be optimized over the entire operating range of the aircraft engine.

In the exemplary embodiment of FIG. 1, the auxiliary rotor 18 is connected directly to a shaft 21 of a low pressure turbine (not depicted). In this case, the auxiliary rotor 18 is thus driven directly by the low-pressure turbine, such that the low-pressure turbine is thus a high-speed low-pressure turbine. In the exemplary embodiment shown in FIG. 1, a gear unit 22 is positioned between the fan rotor 13 and the shaft 21.

The gear unit 22 is used to reduce the speed of the shaft 21 to the lower speed required to drive the fan rotor 13. The gear unit 22 may further be used to adjust the direction of rotation of the fan rotor 13 such that it rotates either in the same direction or in the opposite direction of the auxiliary rotor 18. Preferably, the auxiliary rotor 18 rotates in the opposite direction of the fan rotor 13.

As may be seen in FIG. 1, a coupling 23 and a coupling 24, respectively, is inserted, on the one hand, between the shaft 21 and the auxiliary rotor 18 and, on the other hand, between the gear unit 22 and the fan rotor 13.

As already mentioned, in the exemplary embodiment of FIG. 1 the auxiliary rotor 18 is driven directly by the shaft 21 of the low-pressure turbine (not depicted), whereas the fan rotor 13 is driven indirectly by the shaft 21 with the interposition of a gear unit 22. In contrast to the exemplary embodiment shown in FIG. 1, it is also possible to couple the fan rotor 13 directly to the shaft 21 of the low-pressure turbine, so that it is driven directly by the shaft 21. This embodiment is preferred if the low-pressure turbine is designed as a low-speed low-pressure turbine. In this case a gear unit is positioned between the shaft 21 and the auxiliary rotor 18, which steps up the relatively low speed of the shaft 21 to a relatively higher speed required to drive the auxiliary rotor 18.

It is also possible to position a gear unit each between the auxiliary rotor 18 and the shaft 21 and between the fan rotor 13 and the shaft 21. Preferred, however, is an embodiment in which a gear unit is placed either only between the fan rotor 13 and the shaft 21 or only between the auxiliary rotor 18 and the shaft 21. Working with only one gear unit results in a more compact, lighter and ultimately more cost effective aircraft engine design.

It should be noted here that the auxiliary blades 19 of the auxiliary rotor 18 may be provided with an outer shroud or end plate at their radially outer ends 25. End plates are also referred to as winglets. The use of an outer shroud or end plates at the radially outer ends of the auxiliary blades 19 makes it possible to minimize losses at the flow margins.

Figure 2:
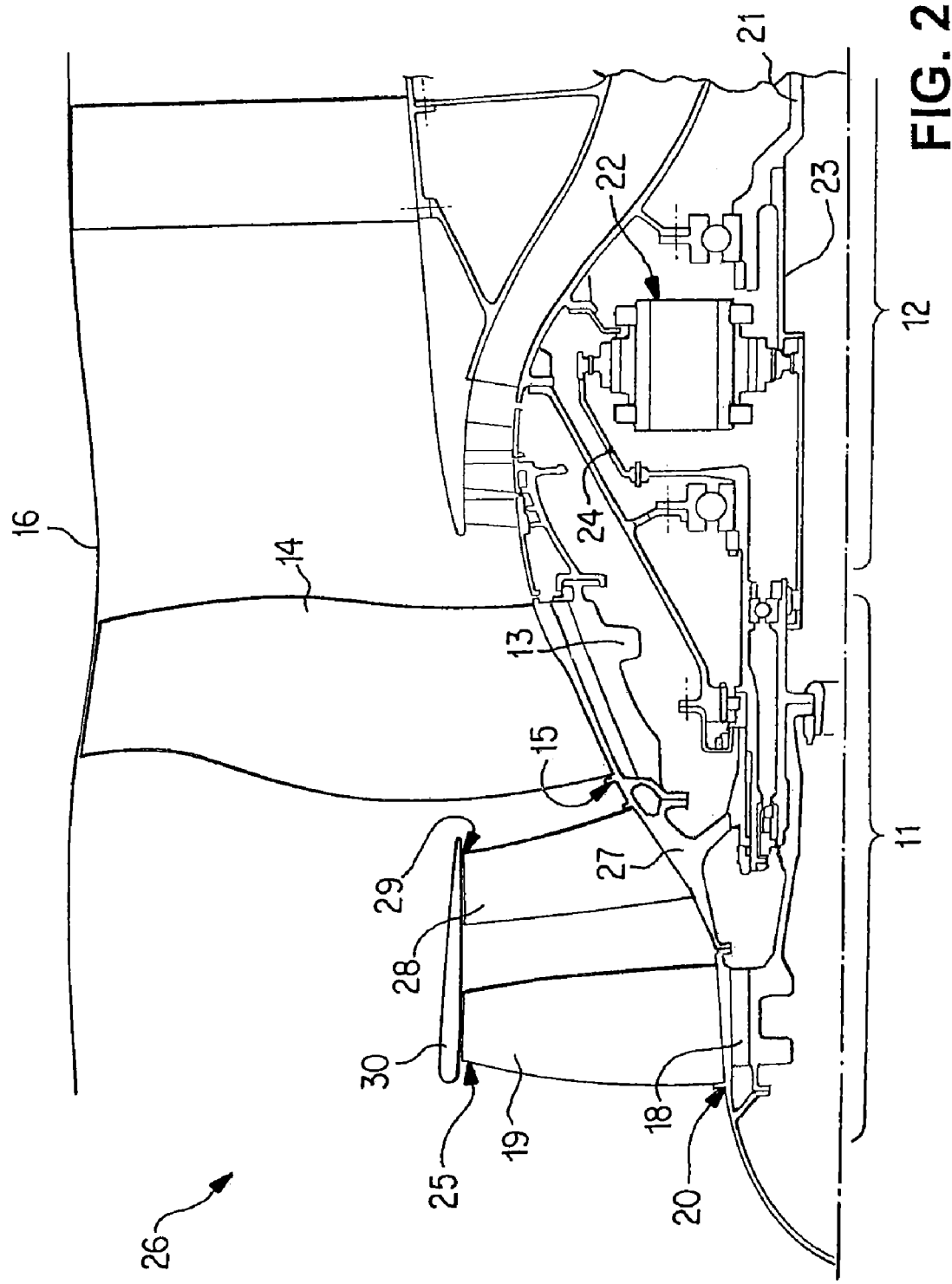
FIG. 2 is a cross-sectional detail of the aircraft engine according to the invention based on a second exemplary embodiment.

FIG. 2 illustrates a fan area and the adjacent core engine downstream of the fan in another exemplary embodiment of an aircraft engine 26 according to the invention. Since the aircraft engine 26 shown in FIG. 2 essentially corresponds to the aircraft engine 10 shown in FIG. 1, the same reference numbers are used for the same components to avoid unnecessary repetition and reference is made to the explanations given above. The details of the aircraft engine 26 illustrated in FIG. 2 that distinguish the aircraft engine 26 of FIG. 2 from the aircraft engine 10 of FIG. 1 are described below.

In the exemplary embodiment shown in FIG. 2, an additional auxiliary rotor 27 is positioned between the auxiliary rotor 18 and the fan rotor 13, which are designed as separate rotors. The additional auxiliary rotor 27 is an integral component of the fan rotor 13 and is thus operable at the same speed and in the same direction of rotation as the fan rotor 13. The additional auxiliary rotor 27 has auxiliary blades 28, the radial extent of which corresponds approximately to the extent of the auxiliary blades 19 of the auxiliary rotor 18, which is designed as a separate rotor. According to FIG. 2, the auxiliary blades 28 of the auxiliary rotor 27 have shrouds 30 at their radially outer ends 29, which extend into the range of the auxiliary blades 19 of the auxiliary rotor 18, which is designed as a separate rotor, such that the shrouds 30 form a housing or inlet covering for the auxiliary blades 19, i.e., the ends 25 thereof, of the auxiliary rotor 18, which is designed as a separate rotor.

For a given outside fan diameter, the fan according to the invention enables a substantial increase in the mass flow and a substantial increase in the compression ratio in the hub region. The result is a lower compression ratio in the outer region of the fan for a given fan diameter and a specific thrust. This lower compression ratio in the outer fan region is generated by a loser circumferential speed, such that the relative Mach numbers become smaller, and fewer losses and an optimized efficiency can ultimately be achieved. The lower circumferential speed and the reduced compression ratio further contribute to noise reduction. In addition, foreign bodies and impurities can be better centrifuged out of the air drawn in, such that the risk of damage to and erosion in the core engine is reduced The increased mass flow rate realizable with the present invention can also Be used to reduce the fan diameter and thus the weight

REFERENCE NUMBERS 10 aircraft engine
11 fan
12 core engine
13 fan rotor
14 fan blade
15 hub
16 flow path wall
17 fan flow path
18 auxiliary rotor
19 auxiliary blade
20 hub
21 shaft
22 gear unit
23 coupling
24 coupling
25 end
26 aircraft engine
27 auxiliary rotor
28 auxiliary blade
29 end
30 shroud The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fan for an aircraft engine, comprising:
a fan rotor with fan blades that extend radially outwardly from a hub to an outer flow path wall of a fan flow path; and
an auxiliary rotor positioned upstream of the fan rotor with auxiliary blades that extend radially outwardly from a hub and end at a distance from the outer flow path wall of the fan flow path, and wherein the auxiliary blades of the auxiliary rotor have a radial extent that is between 30% and 50% of a radial extent of the fan flow path;
wherein the auxiliary rotor and the fan rotor are separate rotors, such that the auxiliary rotor is operable at a higher speed than the fan rotor and wherein the auxiliary rotor and the fan rotor are driven in opposite directions of rotation.

2. The fan as claimed in claim 1 wherein a transmission ratio between an auxiliary rotor speed and a fan rotor speed is fixed.

3. The fan as claimed in claim 1 wherein a transmission ratio between an auxiliary rotor speed and a fan rotor speed is variable.

4. The fan as claimed in claim 1 wherein the auxiliary blades of the auxiliary rotor have an outer shroud at a radially outer end.

5. The fan as claimed in claim 1 wherein the auxiliary blades of the auxiliary rotors have an end plate at a radially outer end.

6. A fan for an aircraft engine, comprising:
   a fan rotor with fan blades that extend radially outwardly from a hub to an outer flow path wall of a fan flow path; and
   an auxiliary rotor positioned upstream of the fan rotor with auxiliary blades that extend radially outwardly from a hub and end at a distance from the outer flow path wall of the fan flow path, and wherein the auxiliary blades of the auxiliary rotor have a radial extent that is between 30% and 50% of a radial extent of the fan flow path;
   wherein the auxiliary rotor and the fan rotor are separate rotors, such that the auxiliary rotor is operable at a higher speed than the fan rotor;
   and wherein the auxiliary rotor is coupled directly to a shaft of a low pressure turbine and is driven by the shaft.

7. The fan as claimed in claim 6 wherein the fan rotor is coupled to the shaft of the low pressure turbine via an interposed gear unit and is driven by the shaft.

8. The fan as claimed in claim 7, wherein the shaft of the low pressure turbine runs at a relatively high speed and drives the auxiliary rotor directly and wherein the gear unit reduces the relatively high speed of the low pressure turbine to a relatively low speed to drive the fan rotor.

9. A fan for an aircraft engine, comprising:
   a fan rotor with fan blades that extend radially outwardly from a hub to an outer flow path wall of a fan flow path; and
   an auxiliary rotor positioned upstream of the fan rotor with auxiliary blades that extend radially outwardly from a hub and end at a distance from the outer flow path wall of the fan flow path, and wherein the auxiliary blades of the auxiliary rotor have a radial extent that is between 30% and 50% of a radial extent of the fan flow path;
   wherein the auxiliary rotor and the fan rotor are separate rotors, such that the auxiliary rotor is operable at a higher speed than the fan rotor;
   and wherein a second auxiliary rotor is positioned between the auxiliary rotor and the fan rotor and wherein the auxiliary rotor and the second auxiliary rotor are separate rotors.

10. The fan as claimed in claim 9 wherein the second auxiliary rotor is an integral component of the fan rotor and is operable at a same speed as the fan rotor.

11. The fan as claimed in claim 9 wherein auxiliary blades of the second auxiliary rotor have a radial extent that corresponds approximately to a radial extent of the auxiliary blades of the auxiliary rotor.

12. The fan as claimed in claim 9 wherein auxiliary blades of the second auxiliary rotor have a shroud that extends into a range of the auxiliary blades of the auxiliary rotor such that the shrouds of the auxiliary blades of the second auxiliary rotor form a housing for the auxiliary blades of the auxiliary rotor.

13. An aircraft engine, comprising:
   a fan; and
   a core engine including at least one compressor, at least one combustion chamber, and at least one turbine;
   wherein the fan includes:
      a fan rotor with fan blades that extend radially outwardly from a hub to an outer flow path wall of a fan flow path; and
      an auxiliary rotor positioned upstream of the fan rotor with auxiliary blades that extend radially outwardly from a hub and end at a distance from the outer flow path wall of the fan flow path, and wherein the auxiliary blades of the auxiliary rotor have a radial extent that is between 30% and 50% of a radial extent of the fan flow path;
      wherein the auxiliary rotor and the fan rotor are separate rotors, such that the auxiliary rotor is operable at a higher speed than the fan rotor, and wherein the auxiliary rotor and the fan rotor are driven in opposite directions of rotation.

14. A method of operating an aircraft engine, comprising the steps of:
   operating a fan rotor with fan blades that extend radially outwardly from a hub to an outer flow path wall of a fan flow path at a first speed;
   operating an auxiliary rotor positioned upstream of the fan rotor with auxiliary blades that extend radially outwardly from a hub and end at a distance from the outer flow path wall of the fan flow path at a second speed, wherein the auxiliary blades of the auxiliary rotor have a radial extent that is between 30% and 50% of a radial extent of the fan flow path and wherein the first speed is less than the second speed;
   operating the fan rotor in a first direction of rotation; and
   operating the auxiliary rotor in a second direction of rotation;
   wherein the first direction of rotation is opposite of the second direction of rotation.

15. A method of operating an aircraft engine, comprising the steps of:
   operating a fan rotor with fan blades that extend radially outwardly from a hub to an outer flow path wall of a fan flow path at a first speed;
   operating an auxiliary rotor positioned upstream of the fan rotor with auxiliary blades that extend radially outwardly from a hub and end at a distance from the outer flow path wall of the fan flow path at a second speed, wherein the auxiliary blades of the auxiliary rotor have a radial extent that is between 30% and 50% of a radial extent of the fan flow path and wherein the first speed is less than the second speed; and
   operating a second auxiliary rotor at the first speed wherein the second auxiliary rotor is positioned between the auxiliary rotor and the fan rotor.

16. The method of claim 15 further comprising the steps of:
   operating the fan rotor and the second auxiliary rotor in a first direction of rotation; and
   operating the auxiliary rotor in a second direction of rotation;
   wherein the first direction of rotation is opposite of the second direction of rotation.

* * * * *